(12) United States Patent
Hoeber et al.

(10) Patent No.: US 7,788,261 B2
(45) Date of Patent: Aug. 31, 2010

(54) INTERACTIVE WEB INFORMATION RETRIEVAL USING GRAPHICAL WORD INDICATORS

(75) Inventors: Orland Hoeber, Regina (CA); Xue-Dong Yang, Regina (CA)

(73) Assignee: University of Regina, Regina, Saskatchewan (CA)

( * ) Notice: Subject to any disclaimer, the term of this patent is extended or adjusted under 35 U.S.C. 154(b) by 181 days.

(21) Appl. No.: 11/640,817

(22) Filed: Dec. 18, 2006

(65) Prior Publication Data

US 2008/0147638 A1 Jun. 19, 2008

(30) Foreign Application Priority Data

Dec. 14, 2006 (CA) .................................. 2571172

(51) Int. Cl.
G06F 7/00 (2006.01)
(52) U.S. Cl. ............................... 707/728; 707/E17.108
(58) Field of Classification Search ............... 707/1–10, 707/728, E17.108
See application file for complete search history.

(56) References Cited

U.S. PATENT DOCUMENTS

| 5,926,811 | A | * | 7/1999 | Miller et al. ..................... 707/5 |
| 5,987,457 | A | * | 11/1999 | Ballard ........................... 707/5 |
| 6,094,648 | A | * | 7/2000 | Aalbersberg .................... 707/3 |
| 2003/0037050 | A1 | * | 2/2003 | Monteverde .................... 707/6 |
| 2005/0234953 | A1 | * | 10/2005 | Zhang et al. ................ 707/101 |
| 2006/0004734 | A1 | * | 1/2006 | Malkin et al. ................... 707/4 |
| 2006/0161535 | A1 | | 7/2006 | Holbrook |
| 2006/0167864 | A1 | | 7/2006 | Bailey et al. |
| 2006/0190444 | A1 | | 8/2006 | Wesinger, Jr. et al. |
| 2006/0190459 | A1 | | 8/2006 | Wesinger, Jr. et al. |
| 2006/0242129 | A1 | | 10/2006 | Libes et al. |
| 2006/0242131 | A1 | | 10/2006 | Okabe et al. |

FOREIGN PATENT DOCUMENTS

| EP | 1 708 105 A1 | 10/2006 |
| WO | WO 2006/096939 A1 | 9/2006 |
| WO | WO 2006/104952 A1 | 10/2006 |
| WO | WO 2006/110912 A2 | 10/2006 |

OTHER PUBLICATIONS

"Query Previews in Networked Information Systems" by Doan et al, Proc. of the Third Forum on Research and Technology Advances in Digital Libraries, ADL '96, Washington, D.C., May 13-15, 1996, IEEE CS Press, 120-129.*

* cited by examiner

*Primary Examiner*—Tim T. Vo
*Assistant Examiner*—Shiow-Jy Fan
(74) *Attorney, Agent, or Firm*—Patterson, Thuente, Christensen, Pedersen, P.A.

(57) ABSTRACT

An apparatus and method is provided that conducts a web search or other computer readable document search and obtains search results comprising a number of meta-documents where each meta-document describes a web pages or other document located in the search. The meta-documents retrieved in the search results are then analyzed to determine the frequency of occurrence of terms used in these meta-documents and the most commonly occurring of these terms are then presented in a visual representation to the user to allow the user to see what are the most commonly occurring of these terms as well as the frequency with which these terms appear relative to other terms in the search results. Using the visual representations of these commonly occurring terms, a user can re-sort the search results by selected terms or alter the original search query by adding or removing terms from the search query.

48 Claims, 10 Drawing Sheets

INTERACTIVE WEB INFORMATION RETRIEVAL USING GRAPHICAL WORD INDICATORS

RELATED APPLICATION

The present application claims priority to Canadian Application Number 2,571,172 entitled INTERACTIVE WEB INFORMATION RETRIEVAL USING GRAPHICAL WORD INDICATORS, filed Dec. 14, 2006, which is incorporated herein in its entirety by reference.

BACKGROUND

The World Wide Web has given computer users on the internet access to vast amounts of information in the form of billons of Web pages. Each of these pages can be accessed directly by a user typing the URL (universal resource locator) of a web page into a web browser on the user's computer, but often a person is more likely to access a website by finding it with the use of a search engine. A search engine allows a user to input a search query made up of words or terms that a user thinks will be used in the web pages containing the information he or she is looking for. The search engine will attempt to match web pages to the search terms in the search query and will then return the located web pages to the user.

The search results generated from a user's search query typically consist of a collection of meta-documents, each of which contains summary information, attributes, and other data about the matched documents. These meta-documents are often present in a simple list-based format, displaying the title of the document, a snippet containing the query terms in context, and the uniform resource locator (the URL). A user can then select one of the returned entries to view the corresponding web page.

It is common for web searchers to have difficulties crafting queries to fulfill their information needs. This can result in many, if not most, of the search results not being strongly related to the information the searcher was attempting to find. Even when a searcher provides a good query, he or she often finds it challenging to evaluate the results of their web searches.

With the continued growth of web pages available on the internet making the task of search engines more and more difficult, web search engines have greatly increased the size of their indexes and made significant advances in the algorithms used to match a user's search query to these indexes. However, while it is clear that significant effort has gone into creating web search engines that can index billion of documents and return the search results in a fraction of a second, this has resulted in the creation of the problem of search queries returning more results than the user can easily consider. This is making it even more important to properly craft search queries and to be able to easily evaluate whether a search query has been effective or not.

SUMMARY OF THE INVENTION

It is an object of the present invention to provide a method and apparatus that overcomes problems in the prior art.

In a first aspect of the invention, a method for displaying commonly occurring terms in search results is provided. The method comprises: using a search query containing a plurality of search terms to have a search conducted of a plurality of computer readable documents and obtain search results, the search results comprising a set of meta-documents, each meta-document in the set of meta-documents corresponding to a computer readable document located in the search and comprising a summary of the corresponding computer readable document; determining a set of commonly occurring terms by: analyzing each meta-document in at least a portion of the set of meta-documents; selecting a plurality of terms in the at least a portion of the set of meta-documents; and determining an occurrence frequency for each selected term in the at least a portion of the set of meta-documents, the set of commonly occurring terms comprising terms in addition to the search terms; and displaying at least a portion of the search results simultaneously with the set of commonly occurring terms.

In a second aspect of the invention, a data processing system for displaying commonly occurring terms in search results is provided. The data processing system comprises: at least one processor; a memory operatively coupled to the at least one processor; a display device operative to display data; and a program module stored in the memory and operative for providing instructions to the at least one processor. The at least one processor is responsive to the instructions of the program module. The program module operative is to: having a search conducted of a plurality of computer readable documents using a search query containing a plurality of search terms and obtain search results, the search results comprising a set of meta-documents, each meta-document in the set of meta-documents corresponding to a computer readable document located in the search and comprising a summary of the corresponding computer readable document; determining a set of commonly occurring terms by: analyzing each meta-document in at least a portion of the set of meta-documents; selecting a plurality of terms in the at least a portion of the set of meta-documents; and determining an occurrence frequency for each selected term in the at least a portion of the set of meta-documents, the set of commonly occurring terms comprising terms in addition to the search terms; and displaying on the display device at least a portion of the search results simultaneously with the set of commonly occurring terms.

In a third aspect of the invention, a data processing system product comprising a computer useable medium including a computer readable program for displaying commonly occurring terms in search results is provided. The computer readable program when executed on a data processing system causes the data processing system to: have a search conducted of a plurality of computer readable documents using a search query containing a plurality of search terms and obtain search results, the search results comprising a set of meta-documents, each meta-document in the set of meta-documents corresponding to a computer readable document located in the search and comprising a summary of the corresponding computer readable document; determine a set of commonly occurring terms by: analyzing each meta-document in at least a portion of the set of meta-documents; selecting a plurality of terms in the at least a portion of the set of meta-documents; and determining an occurrence frequency for each selected term in the at least a portion of the set of meta-documents, the set of commonly occurring terms comprising terms in addition to the search terms; and display at least a portion of the search results simultaneously with the set of commonly occurring terms, with each term in the commonly occurring terms displayed with an occurrence frequency indicator that indicates the relative frequency of the term in the at least a portion of the meta-documents.

The present invention conducts a search of a collection of computer readable documents, such as a web search, database search, etc. and obtains search results identifying documents located in the search. The retrieved search results contain a number of meta-documents with each meta-document corresponding to a document located in the search and containing a summary describing or summarizing the contents of the located document. Meta-documents retrieved in the search results are then analyzed to determine the frequency of occurrence of terms used in these meta-documents and the most commonly occurring of these terms are then presented in a visual representation to the user to allow the user to see what are the most commonly occurring of these terms as well as the frequency with which these commonly occurring terms appear in the analyzed meta-documents relative to other terms.

Using the visual representations of these commonly occurring terms, a user can re-sort the search results by selected terms or alter the original search query by adding or removing terms from the search query.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Data Processing System

Figure 1:
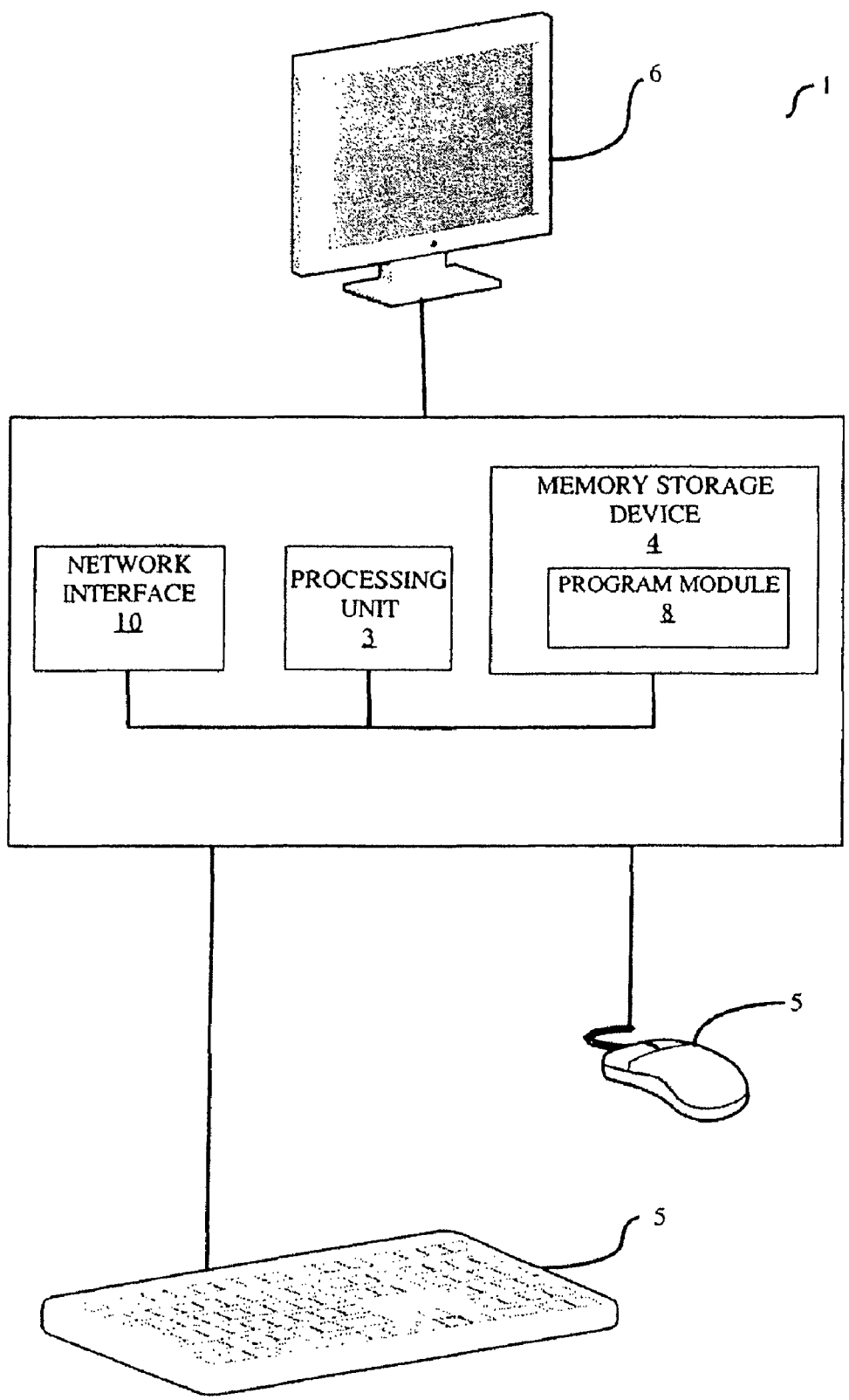
FIG. 1 is schematic illustration of a conventional data processing system capable of implementing the disclosed methods.

FIG. 1 illustrates a data processing system 1 suitable for supporting the operation of methods in accordance with the present invention. The data processing system 1 could be a personal computer, server, mobile computing device, cell phone, etc. The data processing system 1 typically comprises: at least one processing unit 3; a memory storage device 4; at least one input device 5; a display device 6; a program module 8 and a network interface 10.

The processing unit 3 can be any processor that is typically known in the art with the capacity to run the provided methods and is operatively coupled to the memory storage device 4 through a system bus. In some circumstances the data processing system 1 may contain more than one processing unit 3. The memory storage device 4 is operative to store data and can be any storage device that is known in the art, such as a local hard-disk, etc. and can include local memory employed during actual execution of the program code, bulk storage, and cache memories for providing temporary storage. Additionally, the memory storage device 4 can be a database that is external to the data processing system 1 but operatively coupled to the data processing system 1. The input device 5 can be any suitable device suitable for inputting data into the data processing system 1, such as a keyboard, mouse or data port such as a network connection and is operatively coupled to the processing unit 3 and operative to allow the processing unit 3 to receive information from the input device 5. The display device 6 is a CRT, LCD monitor, etc. operatively coupled to the data processing system 1 and operative to display information. The display device 6 could be a stand-alone screen or if the data processing system 1 is a mobile device, the display device 6 could be integrated into a casing containing the processing unit 3 and the memory storage device 4. The program module 8 is stored in the memory storage device 4 and operative to provide instructions to processing unit 3 and the processing unit 3 is responsive to the instructions from the program module 8.

The network interface 10 allows the data processing system 1 to be connected to a computer network such as an intranet or the internet.

Although other internal components of the data processing system 1 are not illustrated, it will be understood by those of ordinary skill in the art that only the components of the data processing system 1 necessary for an understanding of the present invention are illustrated and that many more components and interconnections between them are well known and can be used.

Figure 2A:
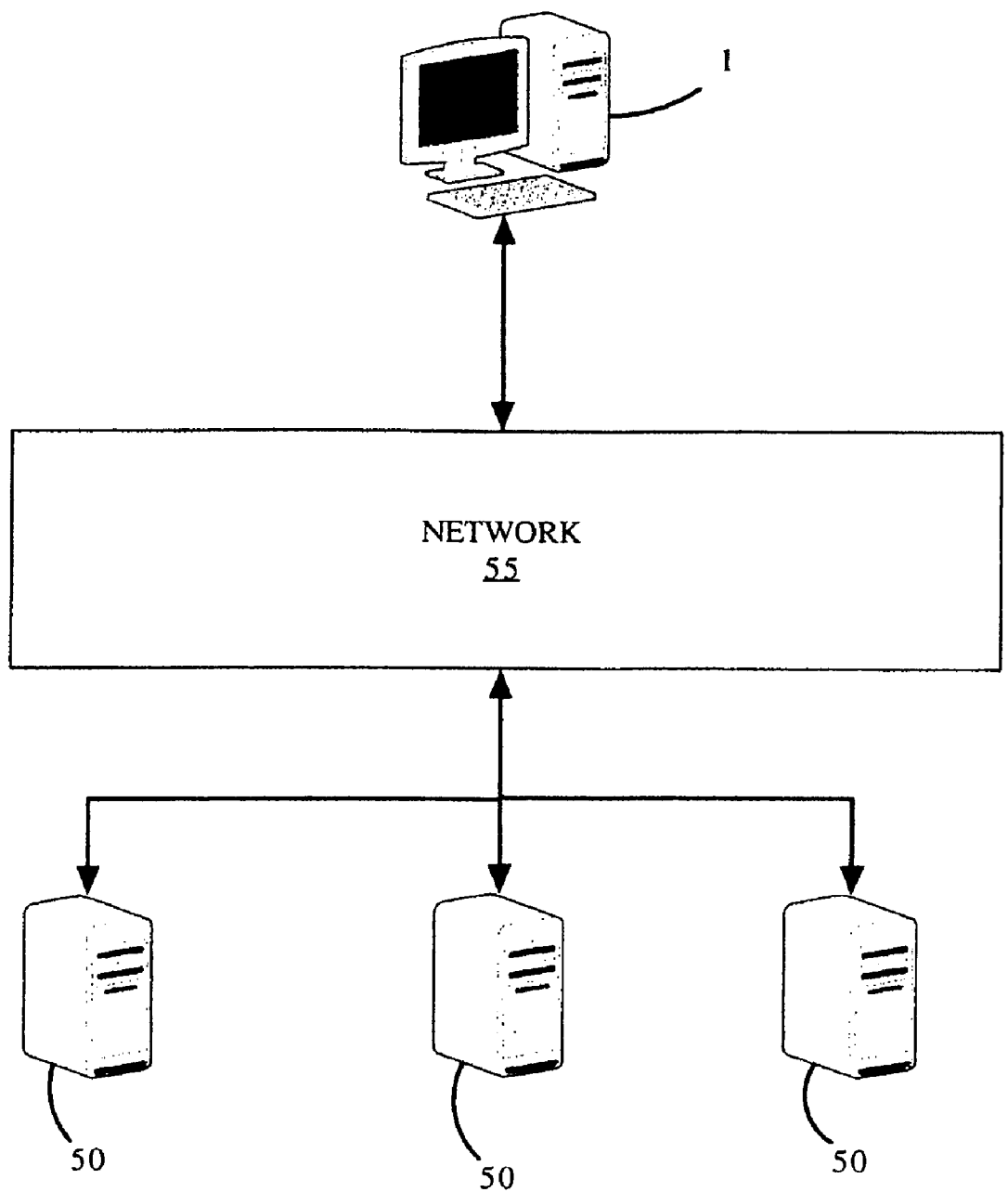
FIG. 2A is schematic illustration of a network configuration wherein a data processing system, operative to implement the provided method in accordance with the present invention, is connected over a network to a plurality of servers operating as a search engine.
Figure 2B:
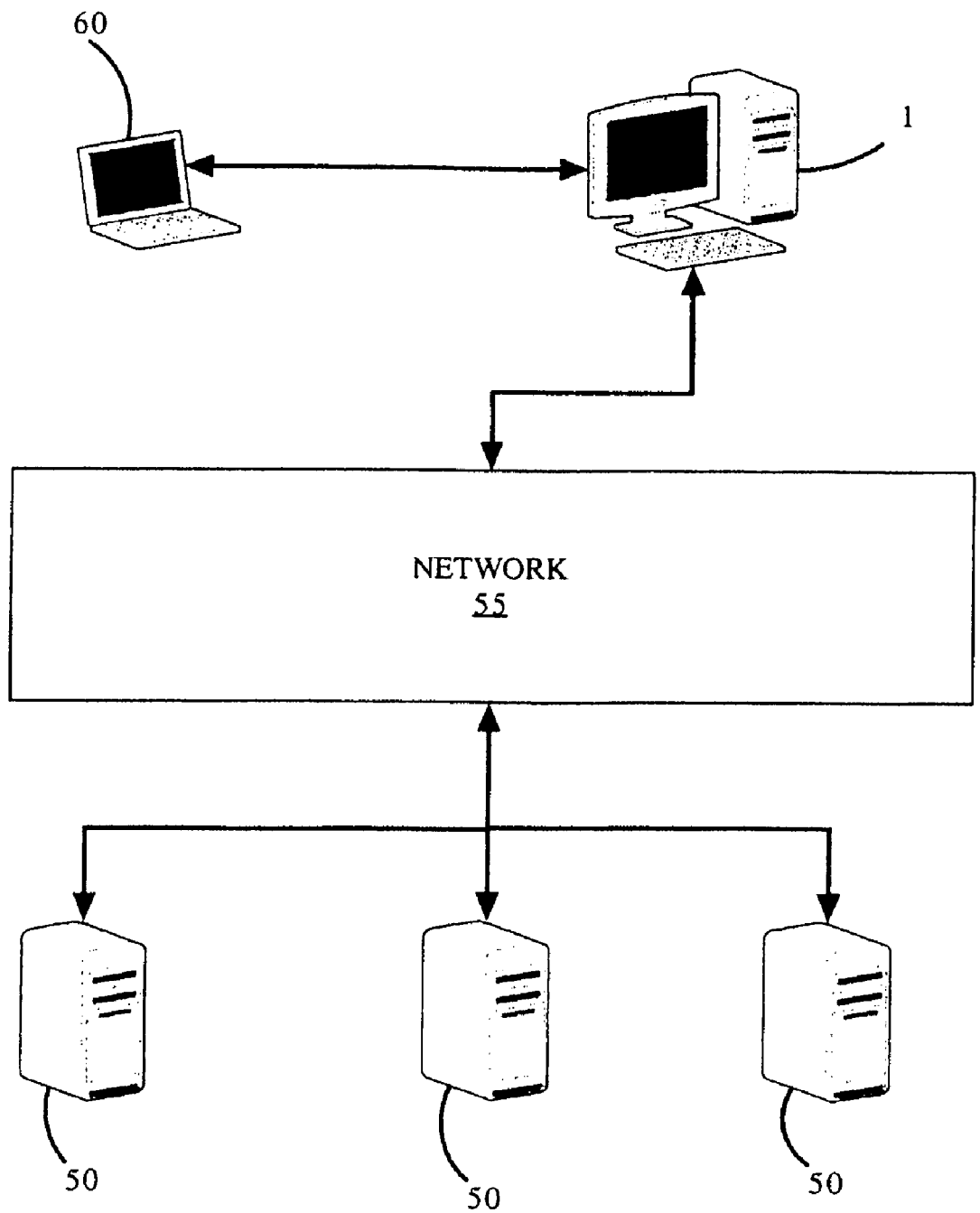
FIG. 2B is a schematic illustration of a network configuration wherein the data processing system is configured as a server in communication with a remote device.

FIG. 2A illustrates a network configuration wherein the data processing system 1 is connected over a network 55 to a plurality of servers 50 operating as a search engine. FIG. 2B illustrates a network configuration wherein the data processing system 1 is configured as a server and a remote device 60, such as another computer, a PDA, cell phone or other mobile device connected to the Internet, is used to access the data processing system 1. The data processing system 1 runs the majority of the software and methods, in accordance with the present invention, and accesses a plurality of servers 50 operating as a search engine to conduct a web search. By having the data processing system 1 configured as a server, the remote client system 60 does not need to have the capacity necessary to contain all the necessary data structures and run all the methods.

Furthermore, the invention can take the form of a computer readable medium having recorded thereon statements and instructions for execution by a data processing system 1. For the purposes of this description, a computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Overview of System

Figure 3:
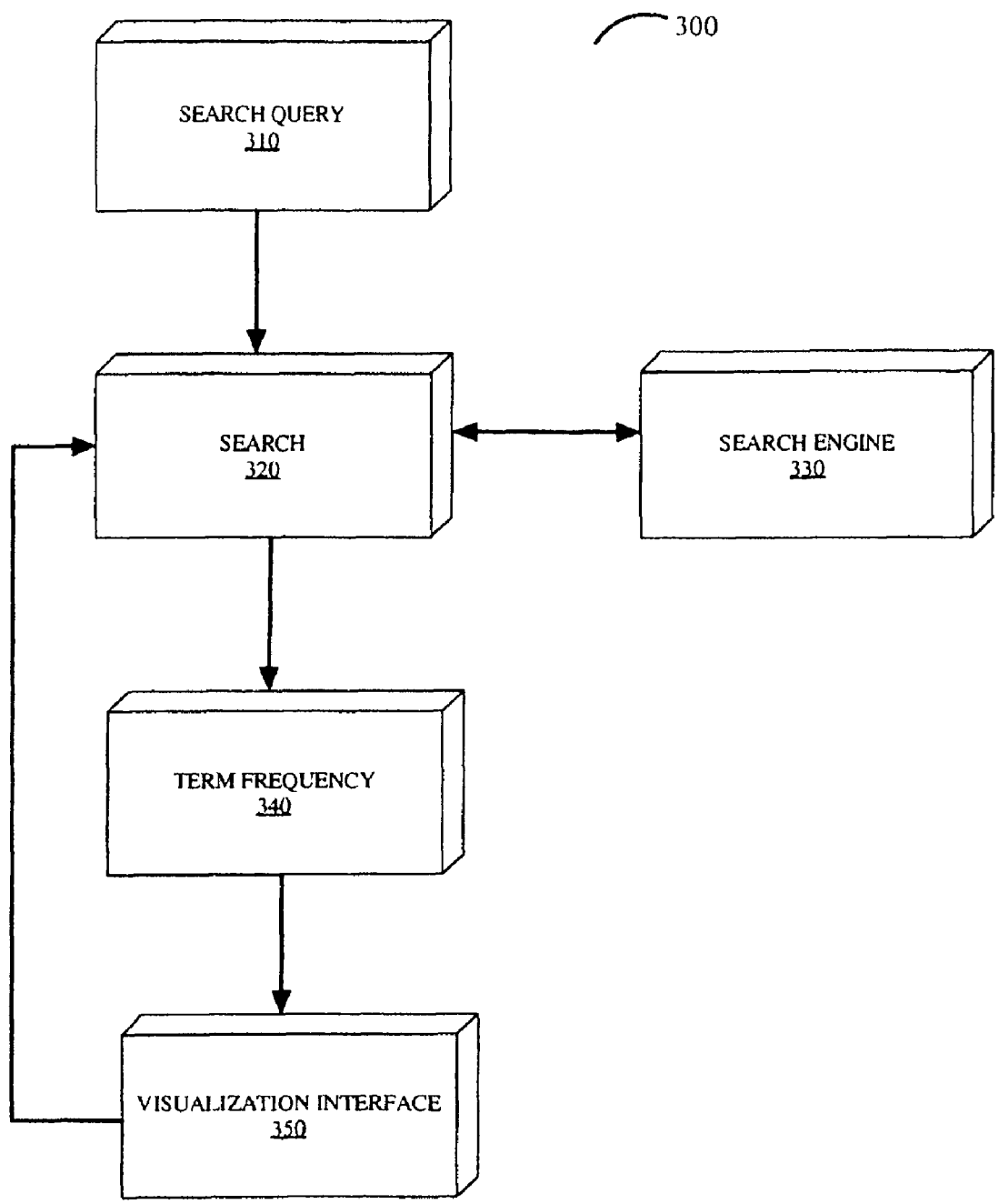
FIG. 3 is a schematic illustration of a software system in accordance with the present invention.

FIG. 3 illustrates a software system in accordance with the present invention. The software system 300 contains: a search query module 310; a search module 320; a search engine module 330; a term frequency module 340; and a visualization interface module 350.

A search query is input to the system 300 at the search query module 310. The search query contains one or more search terms and usually at least two or three search terms. From the search query module 310 this search query containing one or more search terms is passed to the search module 320, which requests a search engine module 330 to search a collection of computer-readable document using the search query and return the results of the search. Typically, the results returned by the search engine module 330 are a list of meta-documents where each meta-document describes a corresponding complete document located by the search engine module 330 in the search.

When the results of the search are received from the search engine module 330, the search results and the search query are then passed from the search module 320 to the term frequency module 340, where the occurrence frequency of terms in the meta-documents are determined for each of the meta-documents returned in the search results.

The determined occurrence frequencies for commonly used terms and the meta-documents are passed to the visualization interface module 350 where the search results are displayed to the user using the occurrence frequencies of commonly used terms to visually represent to a user commonly occurring terms in the search results.

Some search engines, such as the Google™ API, rather than returning all of the meta-documents located in a search at once time, return the search results in spurts or sets of meta-documents. This means that the search results located by the search engine module 330 may pass the search results to the search module 320 in packets as they become available. In this case these packets of meta-documents can be passed from the search module 320 to the term frequency module 340 where they are analyzed to determine the frequency of terms in the meta-documents, and then to the visualization interface module 350 as they are received by the search module 320. This causes the visualization interface module 350 to keep updating its presentation of the search results as more and more search results are analyzed and passed to the visualization interface module 350. As more and more of the search results are received by the visualization interface module 350 the visualization interface module 350 appears to provide an animated growth and re-sorting of the terms until all of the search results have been analyzed and passed to the visualization interface module 350.

The software system 300 can be implemented wholly on a data processing system 1, as shown in FIG. 2A, with only the search engine module 330 resident on a server 50 connected to the data processing system 1 over the network 55. Alternatively, various components of the software system 300 could be resident on a mobile device 60 operably connected to a data processing system 1 which contains other components of the software system 300, as shown in FIG. 2B. For example, the search query module 310 and visualization interface 350 could be resident of the mobile device 60 with the search module 320 and the term frequency module 340 resident on the data processing system 1 and the search engine module 330 resident on one of the servers 50 operably connected by the network 55 to the data processing system 1.

Search Module

When the search query module 310 passes the search query to the search module 320, the search module 320 requests the search engine module 330 to conduct a search using the search query. The search module 320 is typically resident on the data processing system 1 and the search engine module 330 is typically a web search engine, such as the web search engine running on servers 50 in FIGS. 2A and 2B, with the search being conducted on a number of computer readable documents, such as searching for web pages on the World Wide Web. However, the search engine module 330 could be used in any computerized document storage system capable of searching a large number of computer readable documents.

The search engine module 330 could return the results of the search in the form of a list of complete documents where each complete document contains the majority of the contents of a located document, however, due to the likelihood that a relatively large number of documents can be located with the search and to save overhead on the data processing system, the search results are typically returned as a set of meta-documents where each meta-document in the set corresponds to a complete document that was located by the search and the meta-document contains a summary containing text describing the contents of the corresponding complete document that was located in the search.

Figure 4:
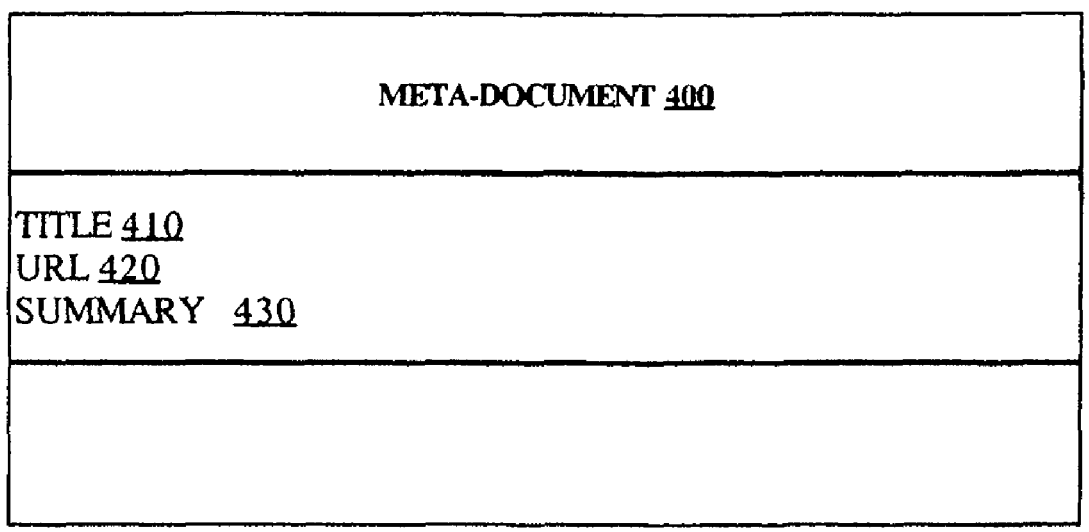
FIG. 4 is a schematic illustration of a document surrogate data object, which is typically provided as a returned document by a search engine as one of a set of search results.

FIG. 4 illustrates a typical meta-document data object 400 which is commonly provided as a returned document by a search engine as one of a set of search results. Rather than a search engine returning a document containing a complete textual copy of each located document that is located in a search, search engines typically provide a set of meta-document data objects 400. Meta-document data objects 400 are the primary data objects in the list-based representation used by search engines. Each meta-document data object 400 provides information describing the corresponding complete document which commonly consists of: a title 410; a URL 420; a summary 430; and any other additional other assorted information. The title 410 is a text string providing the title of the corresponding complete document described by the meta-document data object 400, the URL 420 provides the address of the complete document and the summary 430 contains a short textual description or snippet of the complete document and usually provides the query terms of the search term in context.

Referring again to FIG. 3, the search results obtained by the search module 320 from the search engine module 330 are passed to the term frequency module 340 where the occurrence frequency of terms or words in the textual summaries (and optionally the titles) of the meta-documents are determined.

Term Frequency

In the term frequency module 340, the meta-documents returned from the search as search results are evaluated to determine the frequency of occurrence of terms in the text of the meta-documents. Not only are the search terms analyzed to determine how often the search terms appear in the meta-documents, but other terms as well, are analyzed to determine which terms commonly occur in the meta-documents.

Figure 5:
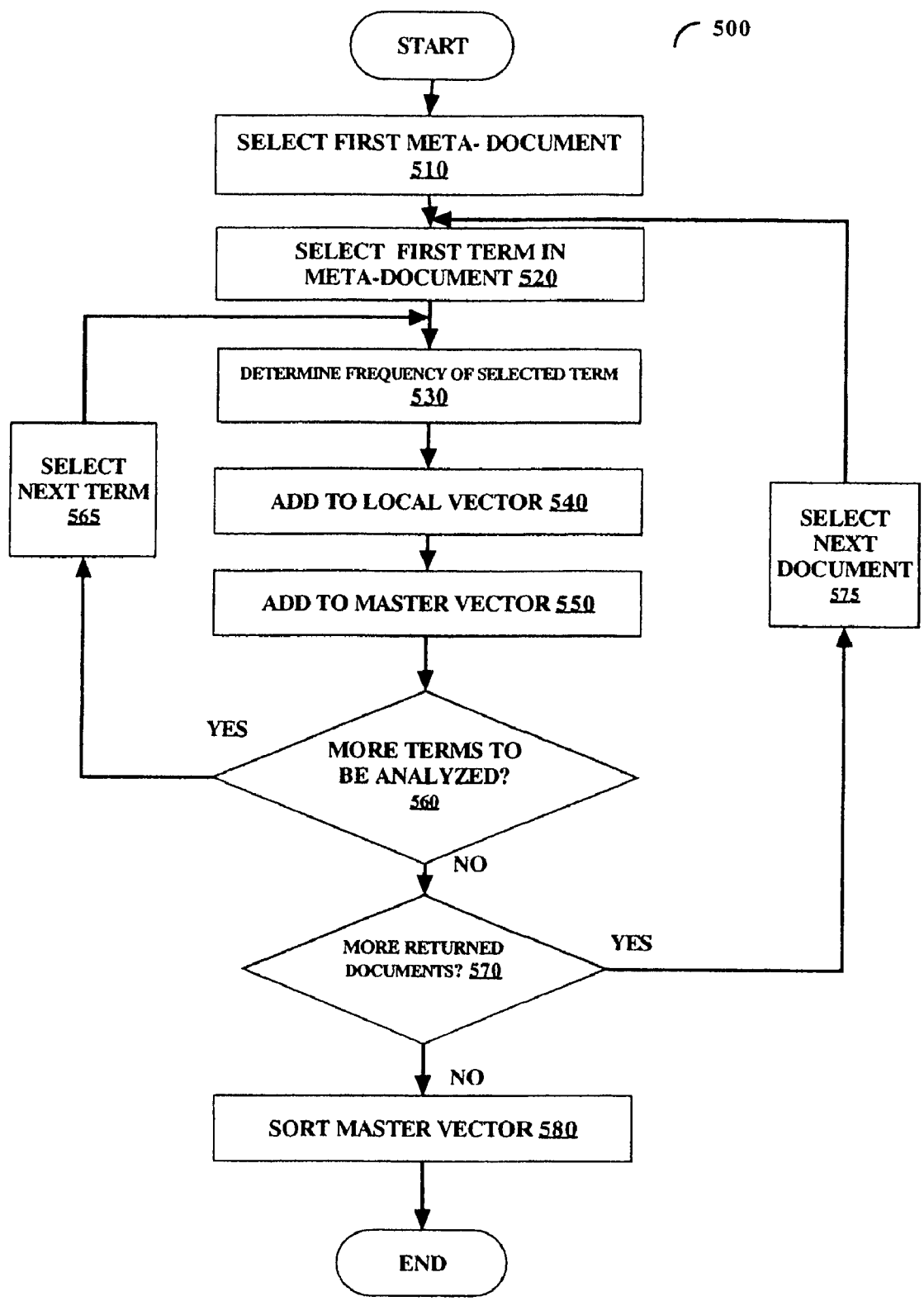
FIG. 5 is a flowchart illustrating a method of creating term frequency vectors, in accordance with the present invention.

FIG. 5 is a flowchart of a method 500 for creating a set of vectors representing the frequency of terms in each of the meta-documents returned as search results from a search, plus an additional vector representing the frequency of terms in all the meta-documents returned as search results from a search. The method 500 comprises the steps of: selecting a first meta-document 510; selecting a first term in the selected meta-document 520; determining the frequency of the selected term 530; adding the frequency of the selected term to a local vector 540; adding the frequency of the selected term to a master vector 550; checking if more terms remain to be analyzed in the selected meta-document 560; selecting the next term 565 and repeating steps 530, 540, 550 and 560 if more terms remain to be analyzed; checking to see if more meta-documents remain to be analyzed 570; selecting the next meta-document 575 and repeating steps 510, 520, 530, 540, 550, 560 if more meta-documents remain; and sorting the master vector 580.

A first meta-document is selected at step 510 and a first term in this selected meta-document is selected at step 520. The frequency of occurrence of the selected term is then determined at step 530. The meta-document will typically have the format of the meta-document data object 400, as shown in FIG. 4, which will contain a document summary 430 containing a text field that summarizes the complete document located in the search. The number of times the selected term occurs in the summary 430 and optionally the title 410 of the meta-document is determined.

Referring again to FIG. 5, once the frequency of the selected term in the selected meta-document has been determined at step 530, this information is added to a local vector at step 540 and a master vector at step 550. The local vector is a multi-dimensional vector wherein each dimension in the vector is represented by a specific term and the magnitude of the vector in the dimension represented by each term is set as the frequency of the term in the selected meta-documents. The local vector is associated with the selected meta-document and each meta-document in the search will have a separate local vector. The master vector is also a multi-dimensional vector where each dimension in the vector represents a term, however, there will only be a single master vector for a complete set of search results. The master vector represents the frequency of occurrences of term in the entire set of search results.

At step 550, when the frequency of the selected term from the selected meta-document is added to the master vector, if the master vector does not contain a dimension representing the selected term, a dimension representing the selected term is created and the frequency of the selected term is used to set the magnitude of this dimension in the master vector. However, if the term already exists as a dimension in the master vector and has a magnitude, the frequency of the selected term is added to this magnitude. In this manner, the master vector will show the frequency of any term represented as a dimension in the vector in all of the meta-documents in the search results.

At step 560 method 500 checks to see if there are any more terms in the selected meta-document to be analyzed. Method 500 could determine the frequency of all the terms in the text of the selected meta-document, however, some of the terms will be common terms that do not provide much useful information regarding the description of the contents of the complete document corresponding to the meta-document. Therefore, generally but not necessarily, method 500 ignores some of them terms in the meta-documents, which will likely not provide much useful information to a user. To avoid including terms from the meta-documents that do not present much useable information to a user, common terms such as definite articles (i.e. the) and words with less than three letters are typically ignored by method 500 and not selected for analysis. By ignoring these types of terms, method 500 prevents analyzing terms in the meta-documents that may frequently appear in the meta-documents yet provide little descriptive value of the meta-document itself. In this manner, terms such as "the" that may frequently appear in the text of the meta-documents, yet provide no real information to a user regarding the contents of the corresponding complete document, are not used in the final presentation of common terms, where they may rank quite highly if they were to be included.

Additionally, to avoid counting terms with different prefixes or suffixes with the same root as separate terms, method 500, generally but not necessarily, uses the roots of the terms rather than the terms themselves. For example, "analyze", "analyzing" and "analysis" may be treated as three occurrences of a single term using the root "analyze", rather than as three separate terms. The roots of the terms can be determined using Porter's stemming algorithm or other appropriate algorithm. In this manner, various words with the same roots are not used as separate dimensions in the local and master vectors.

At step 560, if more terms remain to be analyzed in the selected document, other than terms method 500 is purposely ignoring, the next term is selected at step 565. Again, although all of the terms in a meta-document could be analyzed, generally but not necessarily, common terms are ignored and the terms are classified by their roots. Once the next term is selected at step 565, this next selected term is used and steps 530, 540, 550 and 560 are repeated.

Once all of the terms to be analyzed in the selected meta-document have been tallied to determine a frequency of occurrence for each of the selected terms and these frequencies of occurrences added to the local vector for the selected meta-document and the master vector, the local vector for the selected meta-document is complete.

At step 570 method 500 checks to see if there are more meta-documents to be analyzed. If the search module 320, as shown in FIG. 3, passes the complete set of search results comprising all of the meta-documents located in the search by the search engine module 330 to the term frequency module 340 all at one time, method 500 will have access to all of the search results at one time. Alternatively, if the meta-documents are passed from the search module 320 to the term frequency module 340 as they become available from the search engine module 330, method 500 may run a number of times, prompted when the term frequency module 340 receives one or more meta-documents as they become available.

If at step 570 there are more meta-documents to be analyzed, the method 500 selects the next meta-document at step 575 and steps 510, 520, 530, 540, 550, 560, 565, 570 and 575 are repeated until all of the meta-documents have been analyzed and the frequency of occurrence of the selected terms have been determined and added to the proper local vectors and the master vector. At this point there will be a number of local vectors, one local for each meta-document that was analyzed and only a single master vector. Each local vector shows the frequencies of the terms in the meta-document associated with the local vector and the master vector shows the frequency of occurrence of terms in all of the meta-documents.

By analyzing the terms in the meta-documents that only contains a summary of the complete document rather than the entire contents of the located complete documents, the speed of the operation of method 500 can be improved. Rather than the method 500 having to access the completed document at its location and analyzing what could be quite a substantial body of text in the document, the present method 500 analyzes the text in the meta-documents returned in the search. This removes the need for the method 500 to access the completed document, increasing the speed of the analysis. In addition, the analyzing the meta-documents rather than the corresponding completed documents typically decreases the amount of text to be analyzed by the method 500 further increasing the speed of the analysis by the method 500.

At step 580 the master vector is sorted so that the most frequently occurring terms are located at one end of the master vector.

Although the method 500 can be used to analyze all of the meta-documents returned as search results by the search engine module 330, shown in FIG. 3. In some cases it may be desirable to only analyze a number of the meta-documents returned by the search engine module 330. Typically, the meta-documents analyzed in this case are the ones deemed most relevant by the search engine module 330. For example, in some cases, it has been found that for searches that return numerous meta-documents, analyzing only the top one hundred (100) meta-documents located in the search is sufficient.

Referring to FIG. 3, once method 500 illustrated in FIG. 5 is complete, the master vector, local vectors and search results are passed to the visualization interface 350 where the master vector is used by the visualization interface 350 to visually represent the relative frequencies of the most common terms in the meta-documents returned as search results.

Visualization Interface

The visualization interface module 350 displays the search results in a manner that conveys the frequency of common terms in the meta-documents, located in the search and returned as the search results, in a compact easily interpretable format. The search results, local vectors and the master vector are passed from the term frequency module 340 to the visualization interface module 350, where an interface displays the search results to a user.

Figure 6:
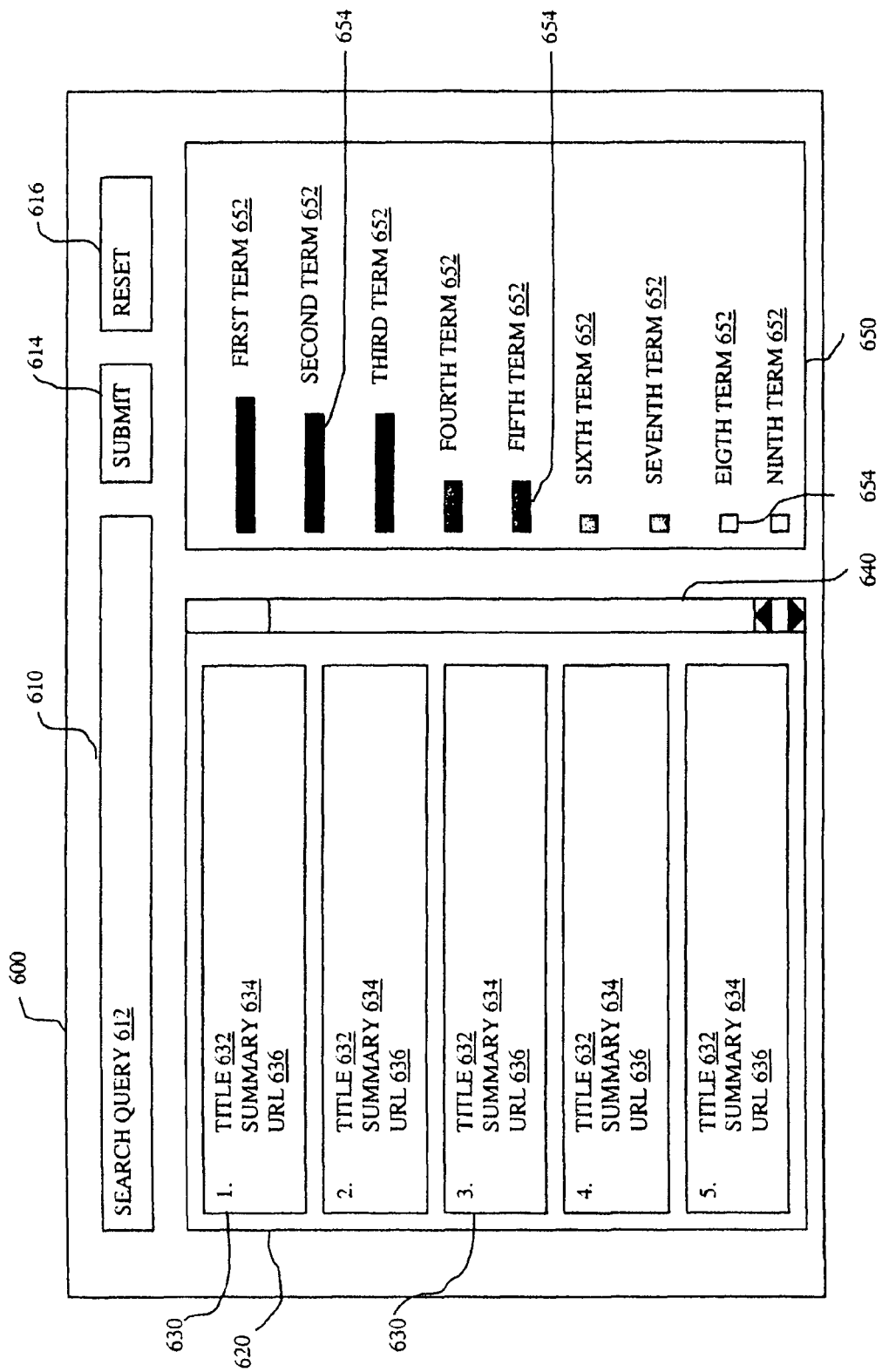
FIG. 6 illustrates an interface used to visually present the search results to a user.

FIG. 6 illustrates a screen shot of an exemplary interface 600. The interface 600 comprises: a search field 610, which displays the search query 612; a submit button 614; a reset button 616; a search results pane 620, displaying a number of meta-documents entries 630 each meta-document entry corresponding to a meta-document returned in the search results; a scroll bar 640; a term overview pane 650, providing an overview of the frequency of occurrence of common terms present in the returned documents of the search results.

The search field 610 is provided that shows the user the terms in the search query 612 that were used to conduct the search. The search field 610 also allows a user to modify or alter the search query 612. A user can enter additional search terms into the search field 610 manually and select the submit button 614 to rerun a search using a new or modified search query.

The search results pane 620 displays a portion of the list of meta-documents that were returned in the search results, with displayed meta-document displayed as a meta-document entry 630. Each meta-document entry 630 displayed in the search results pane 620 is shown as a separate entry and typically comprises: a title 632; a summary 634 and a URL address 636, identifying the address of the actual document located in the search (if the search was a websearch). If the meta-documents returned as search results conform to the meta-document 400 shown in FIG. 4, the title 632 shown in the meta-document entry 630 will typically coincide with the title 410 of the meta-document 400 and the summary 634 will coincide with the summary 430 of the meta-document 400.

Typically, although not necessarily, the title 632 will also contain a link that a user can use to access the original document located in the search that is described by the meta-document by clicking the title 632 with an input device such as a mouse.

The term overview pane 650 presents to a user a visual representation of the frequency of occurrence of terms that are common in the different meta-documents returned in the search results. The frequencies of terms that commonly appear in the search results are visually represented in the term overview pane 650. In one aspect the term overview pane 650 consists of a vertically oriented, color-coded histogram. The most frequently occurring terms in the meta-documents returned as search results are shown in the term overview pane 650. Each term 652 shown in the term overview pane 650 has a corresponding frequency indicator 654 indicating the frequency of occurrence of the term 652 in the search results. Typically, the term overview pane 650 is sorted so that the most frequently occurring terms 652 appear near the top of the list of terms 652 shown in the term overview pane 650.

The frequency indicators 654 indicate the frequency of occurrence of a term 652 relative to the other terms 652 displayed in the term overview pane 650 such as by use of color, a bar size, combination of the two or a numerical or other indicator. For example, in FIG. 6, the frequency indicators 654 indicate the relative frequency of the adjacent term 652 by use of both a length of bar (the longer the bar, the more the term 652 occurs in the search results) and by a color shade (the more intense the color shade, the more the term 652 occurs in the search results).

By providing a visual indication to a user of the relative occurrence frequencies of terms of commonly used terms in the top search results, a user can verify whether or not an initial search query may be locating documents that are relevant. Further, by providing a visual indication of the frequency of the terms, the user can interpret the relative frequency differences between terms. This allows the user to determine which terms are frequently used in the search results and which terms occur infrequently.

By using multiple visual features to represent the same data attribute provides redundant coding and results in an increase in the ease, speed, and accuracy in which the users are able to perceive and interpret the information.

The term overview pane 650 is constructed using the master vector created by the term frequency module 340 shown in FIG. 3. The magnitude of the dimension corresponding with a term 652 in the term overview pane 650 in the multi-dimensional master vector is used to set the frequency indicator 254 of that term 652 in the term overview pane 650. If the master vector is sorted so that the terms with the highest magnitudes appear at the top of the master vector, the master vector will already be sorted by the most commonly occurring terms, making it easier to select and order the terms 656 in the term overview pane 650.

In addition, the interface 600 makes terms appearing in the search query visually distinctive from terms that do not appear in the search query. In one aspect, terms 652 that occurred in the search query are shown in a first color (i.e. red) in the term overview pane 650 whereas other terms 652 that are not in the search query are shown in a different second color (i.e. black). In this manner, a user can quickly look at the term overview pane 650 and determine how frequently the search terms in the search query appear in the returned documents in relation to other commonly occurring terms that do not appear in the search query. A user can than assess how relevant his or her choice of search terms is.

Typically, as a result of space considerations the number of terms 652 from the master vector that are displayed in the term frequency pane 650 may have to be limited to a practical number to allow viewing on the screen of the data processing system running the invention.

Interface 600 allows a user to re-sort the list of search results displayed in the search results pane 620 based on one or more terms 652 the user selects. The list of meta-documents can be re-sorted by a user selecting one or more terms 652 that are present in the term overview pane 650. A user can focus on a particular aspect of his or her information needs and have the list of meta-documents sorted with the most weight given to the selected terms such that meta-documents with higher occurrences of the selected terms 652 rank higher in the order of the list of returned documents than other meta-documents where the selected terms 652 appear less frequently.

A user selects terms 652 from the term frequency pane 650 that he or she would like to re-sort the list by single clicking on the selected term with an input device such as a mouse, roller ball etc. Typically, a utility vector is created inserting a one (1) into each dimension corresponding to a term the user has selected. The dot product of this utility vector and the local vector determined for each meta-document is then determined and the result for each meta-document is used as a document weight to re-rank the meta-documents and re-sort the list of meta-documents. The search results pane 620 is then updated to display the newly sorted list of search results.

Interface 600 also allows a user to add terms to the search query 612. A user can add any of the terms 652 that appear in the term frequency pane 650 to the search query 612 to try to achieve an even more specific search; typically, by double clicking on the term 652. When a user selects a term 652, the term is then added to the search query 612 in the search field 610. A user can then submit this new search query to the search engine module 330 by selecting the submit button 612. A new search for computer readable documents is conducted by the search engine module 330, as shown in FIG. 3, and a new set of search results in the form of a new list of meta-documents is returned and passed to the 330. The interface 600 then displays the new search results.

In this manner a user can refine their search query based on terms 652 appearing in the term frequency pane 650 that are prevalent in the meta-documents located in the search using the previous search query.

If a term is present in both the search query 612 and the terms 652 in the term frequency pane 650, the term can be removed from the search query 612 shown in the search query field 610. The user can then select the submit button 614 to pass the modified search query to the search module 320 where a search is requested from the search engine module 330 using the modified search query. The new search results are then passed to the term frequency module 340 where local vectors for each meta-document and a master vector are determined. The new search results, the local vectors and the master vector are then passed to the visualization interface 350 where the new search results are displayed in interface 600.

Typically, a user will add or remove words from the search query 612 in the search query field 610 by double clicking on the term 652 he or she would like to remove from the search query 612.

Terms 652 in the term overview pane 650 that appear in the search query are shown in a first color (i.e. red) and terms 652 that do not appear in the search query are shown in a second color (i.e. black). In one aspect, when terms are added by a user to the search query 612, by selecting one of the terms 652 in the term overview pane 650 that does not already appear in the search query 612, these added terms 652 are shown in a third color (i.e. green) to visually indicate to a user that these terms 652 have been added to the search query 612 before a user re-runs a search using the new search query 612.

Figure 7:
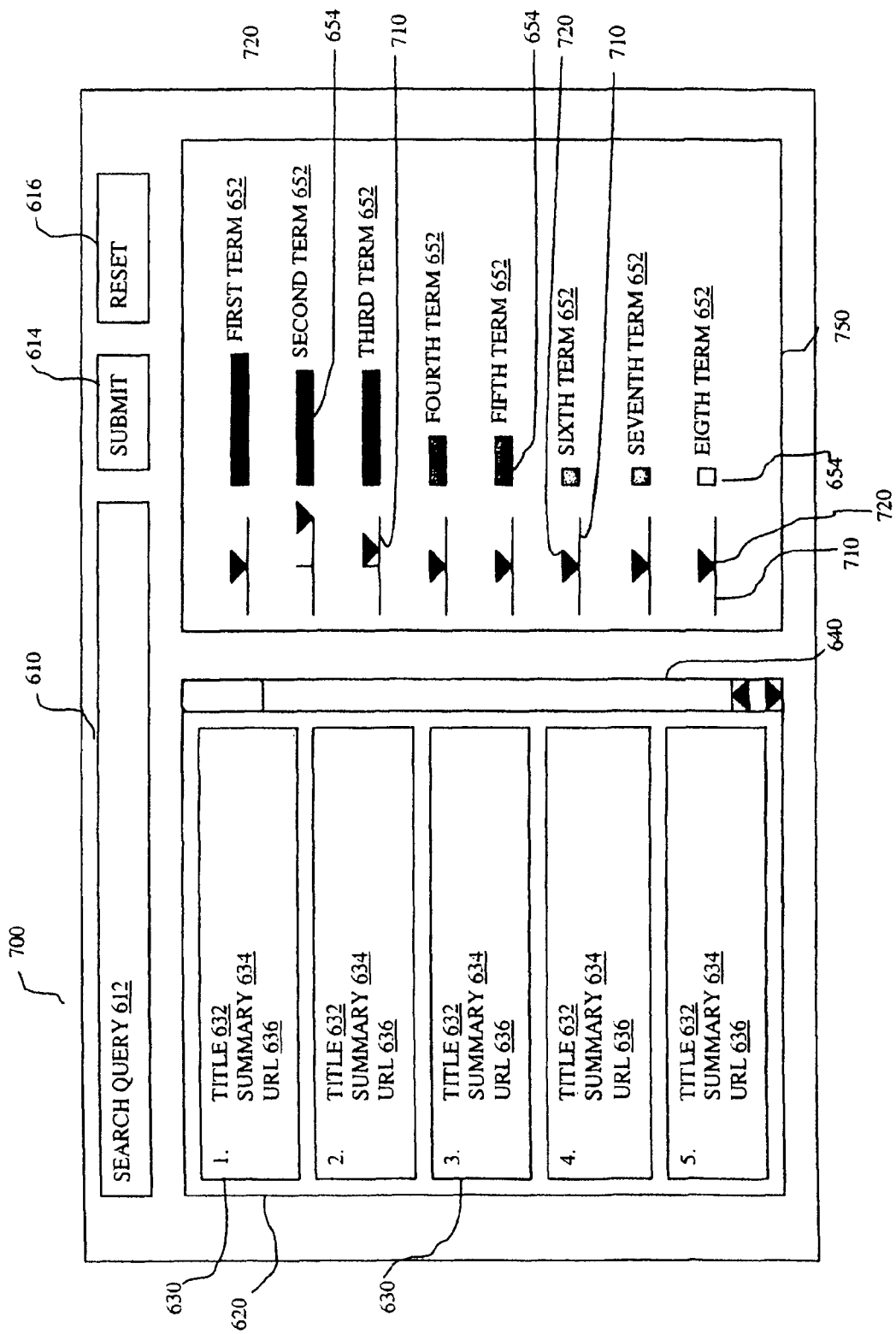
FIG. 7 illustrates another embodiment of an interface used to visually present the search results to a user that allows a user to re-sort the search results by assigning varying weights to commonly occurring terms search results.
Figure 8:
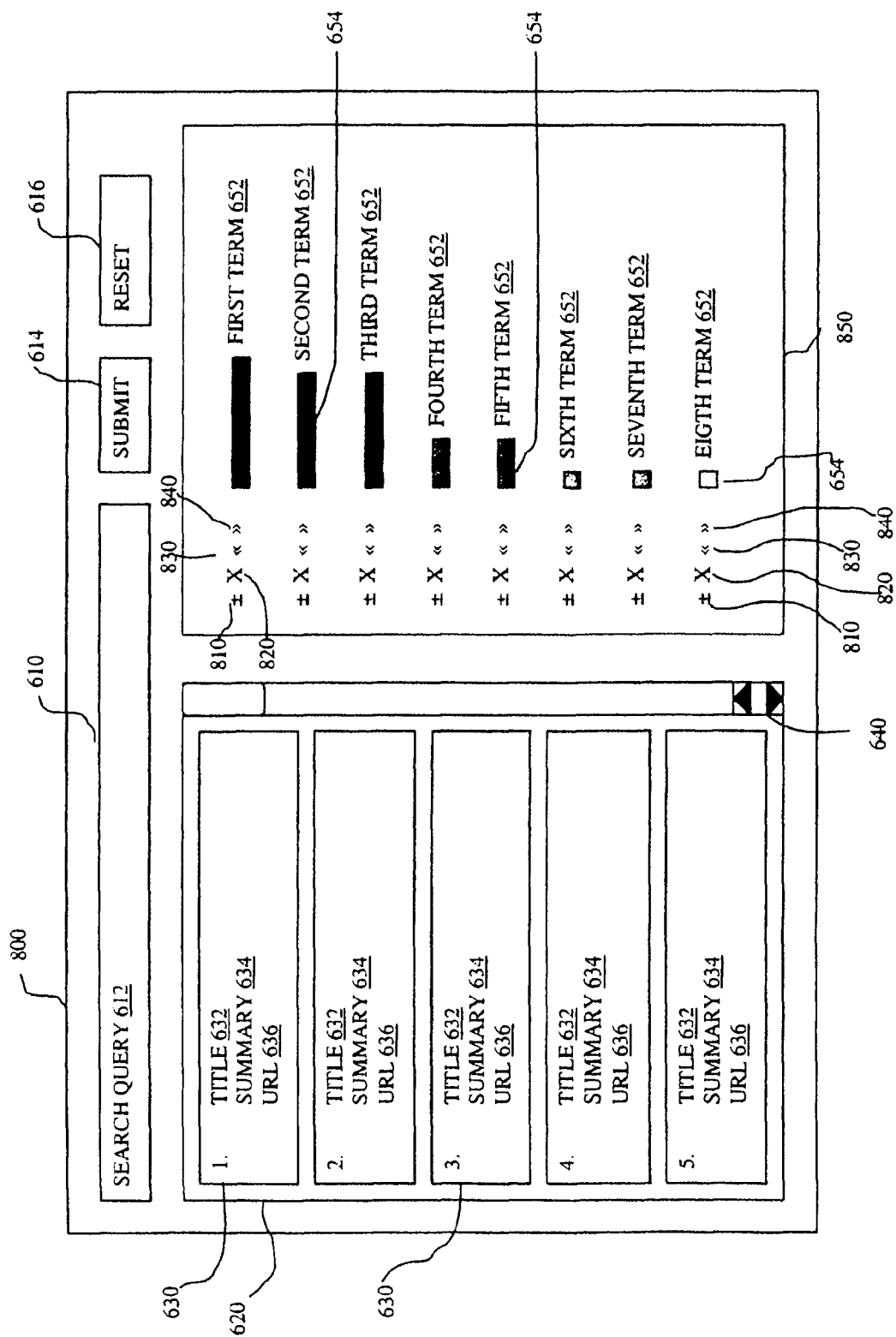
FIG. 8 illustrates a further embodiment of an interface that enables a user to sort the order of his or her search terms.

In the interface 600, illustrated in FIG. 6, the list of search results can be re-sorted based on selecting terms a user is interested in. However, in some cases a user may desire to have an even more complex interaction with the search results. In another embodiment, an interface 700 as illustrated in FIG. 7 is provided that allows a user to weight terms in the term frequency pane 750 and these weights are than taken into account to re-sort the list of meta-documents that were returned as the search results. A user is able to apply positive and negative weights as well as different levels of weights to terms which provides more control over the re-sorting of the list of meta-documents than the binary selection of on or off, as shown in the embodiment illustrated in FIG. 6.

Sliders 710 are positioned adjacent the terms 652 in the term frequency pane 750 and a user can adjust these sliders 710 to weight the importance the user believes the adjacent term 652 is to his or her objective. In one aspect, by leaving a slider 710 so that a grip 720 remains in the center of the slider 710 the term 652 is treated as neutral and no weight is applied to the adjacent term 652. However if the user moves the grip 720 on the slider 710 to the right of the center of the slider 710 a positive weight is applied to the adjacent term 652. Alternatively, by moving the grip 720 on the slider 710 to the left of the center of the slider 710 a negative weight is applied to the adjacent term 652.

For example, the sliders 710 may allow a user to weight each term 652 in the following range (−2, −1, 0, 1, 2), with zero (0) being neutral (no change to the weighting of the document), −2 being the lowest weighting of the document and 2 being the highest weighting of the document.

Once a user has provided all of his or here weights to the terms 652, all of the sliders 710 are used to construct a utility vector $u=(u_1, u_2, \ldots, u_N)$ where $u, \in (-2,2)$ and is an integer value. The list of search results can then be re-sorted with the utility vector by performing the dot product of the local vector of each of the meta-documents to determine a document weight. The list of meta-documents can then be re-sorted based on the determined document weights and the search results pane 620 updated to display the newly sorted list of search results.

By providing a user with greater control over re-sorting of a list of search results by allowing a user to apply a range of weights to frequently occurring terms in the search results, numerous factors come into play. To allow a user to easily keep track of all these factors, interface 700 in FIG. 7 therefore codes terms 652 in the term overview pane 750 to distinguish which terms 652 have had weights assigned to them by the user. Generally, although not necessarily, this coding is done using different colors or color shades in order to distinguish which terms 652 have been weighted positively, which terms have been weighted negatively and which have not been weighted at all.

Terms 652 where the adjacent slider 710 is placed in the neutral position will be shown or highlighted in a default color (i.e. white or black). However, when a user indicates a positive weight for one of the terms 652, the term 652 is then highlighted in a first color in the term frequency pane 750 to indicate to the user which of the terms 652 the user has applied a positive weight to (i.e. red). The coding could also take the form of a colored box appearing around the term 652, a background to the term 652 or simply make the text of the term 652 that color. The level of weighting assigned to the term 652 can in one aspect be represented by the shade of that first color the term 652 is shown in. Alternatively, if a user applies a negative weight to one of the terms 652, the term 652 is then highlighted in a second color, different from the first color (i.e. yellow) to indicate to the user which of the terms 652 the user has applied a negative weight to. Again, in one aspect, the shade of the second color 652 can be used to indicate who heavily the term 642 was negatively weighted.

In this manner a user can quickly scan the terms 652 contained in the term overview pane 750 to determine which of the terms 652 are highlighted in: the default color, showing the weighting has not been altered; the first color, indicating that the user has applied a positive weight to the terms 652, and the second color, indicating that the user has applied a negative weight to the terms 652.

In addition to highlighting the terms 652 in the term frequency pane 750 that have either been weighted positively or negatively by a user, these terms can also be indicated where they occur in the title 632 and summary 634 of the meta-document entries 630 in the search results pane 620; typically be showing the terms in the same colors they are coded with in the term overview pane 750. In this manner, the location where the weighted terms occur in the meta-documents can be brought to the attention of the user as he or she is looking through the search results.

In a further embodiment, more interaction is provided than simply allowing a user to add or remove terms to the search query, a user is also able to sort the search query and exclude terms. Interface 800 uses a term overview pane 850 that allows a user to manipulate a search query by adding and removing terms from a search query. Additionally a user can exclude and/or re-order terms in the search query.

A user can add a term to the search query from the terms 652 appearing in the term overview pane 850 by clicking the add/remove icon 810, in this case illustrated as a plus and minus sign, if the term does not already appear in the search query. In the case where the term already appears in the search query, clicking the add/remove icon 810 will remove the term from the search query.

Additionally, a user can exclude meta-documents from the search results that use a term by selecting the exclude icon 820, in this case an "X". This will exclude the selected term 652 from the search query. Typically, most search engines allow terms to be excluded either with a "not" logical connector or a "-" sign.

Additionally, a user can re-sort the order of the search terms in the search query by using the sorting icons 830 and 840. Some search engines weight search results differently depending upon the order that the search terms appear in the search query. By using the sorting icons 830 and 840, a user can rearrange the order of the search terms in the search query.

Once the user has the search query 612 constructed to his or her preference, the user can submit the new search query 612 to the search engine module 330 by selecting the submit button 614.

Figure 9:
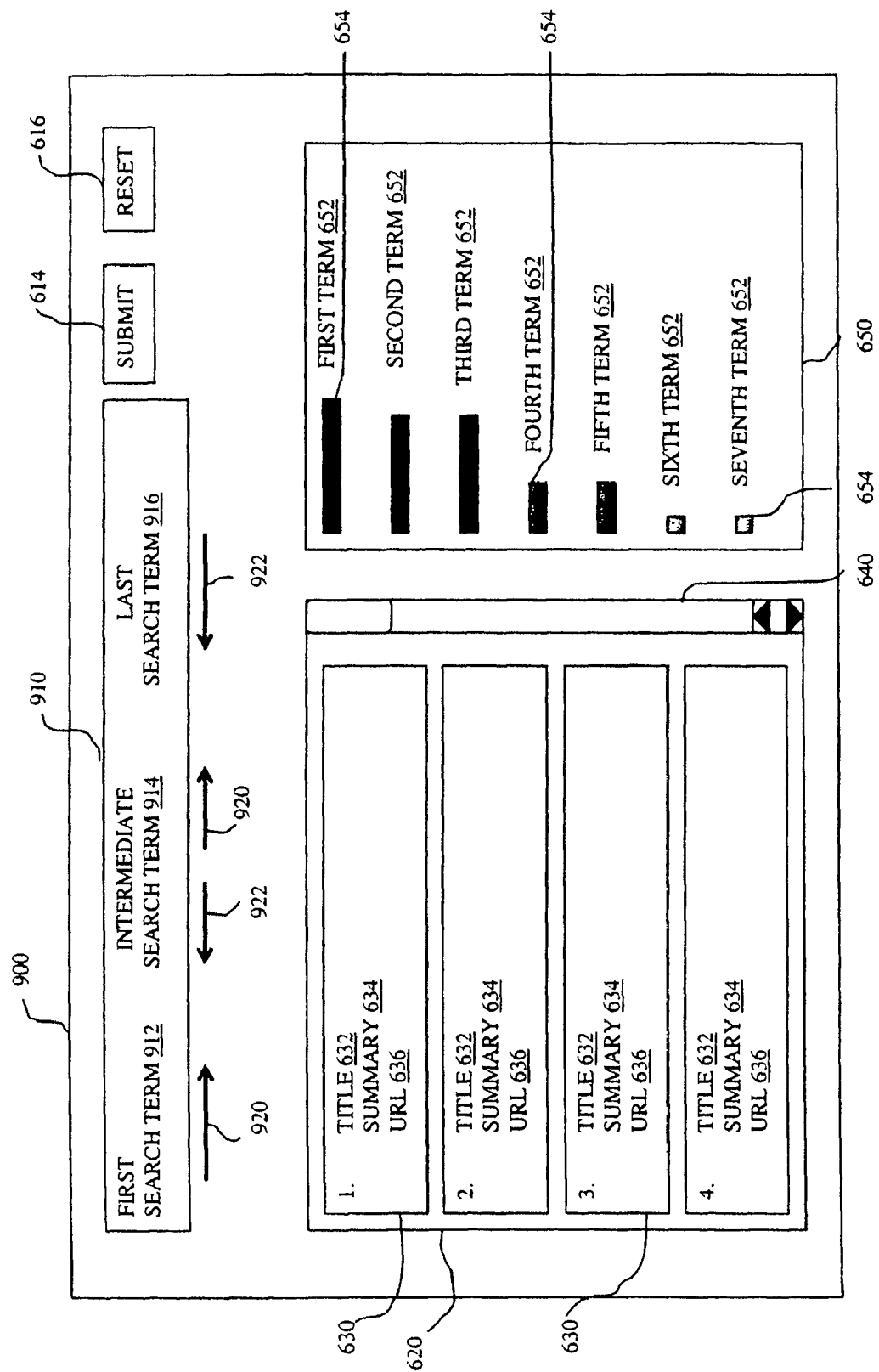
FIG. 9 illustrates an alternate embodiment of the interface illustrated in FIG. 8 that allows a user to manipulate the order of the search terms.

FIG. 9 illustrates a further embodiment of an interface 900 that comprises a search field 910 that allows a user to interactively reorder an ordered search query. Because some search engines place more weight on search terms in the search query that appear earlier in the search query than other search terms that appear later, it is some times desirable to allow a user to reorder their search query. The search field 900 contains a search query comprising a plurality of search terms: a first search term 912, an intermediate search term 914 and a last search term 916. Terms 652 show in the term overview pane 650 can be added to the search query by a user selecting them. Once in the search field 910, the search terms 912, 914 and 916 can be ordered using one of the backward indicating sorting icons 920 or forward indicating sorting icons 922 to reorder the search terms 912, 914 and 916 (although only three search terms are shown in FIG. 9, a person skilled in the art will appreciate than any practical number of search terms can be used). By clicking on one of the sorting icons 920, 922 beneath one of the search terms 912, 914, 916, the user can move the selected search term 912, 914 or 916 in the direction indicated by the selected sorting icon 920, 922 either backwards in the order of the search query by selecting a backwards indicating sorting icon 920 or forwards in the order of the search query by selecting a forward indicating sorting icon 922. For example, by selecting the forwards indicating sorting icon 922 associated with the last search term 916, a user can move the last search term 916 before the intermediate search term 914 in the order of the search query.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be re-sorted to are intended to fall within the scope of the claimed invention.

What is claimed is:

1. A method of creating and displaying enhanced search results, the method comprising:

receiving a search query containing at least one search term provided by a user, the search query received at a server through a network from a remote device;

generating a search result set based on the received search query, the search result set comprising a plurality of meta-documents, each meta-document of the search result set corresponding to a computer readable document, each meta-document of the search result set comprising a summary of relevant terms present in the corresponding computer readable document;

analyzing the generated search result set comprising:

determining, for each meta-document in the search result set, a local frequency of occurrence of the relevant terms in the summary of the meta-document and adding the relevant terms and associated local frequency of occurrence to a local vector associated with the meta-document; and generating a master vector of the frequency of occurrence of relevant terms in all of the meta-documents where each dimension in the master vector represents a term found in the local vectors; and providing the master vector, the local vectors and the search result set to a visualization interface module for displaying the search result set on the remote device, simultaneously with a subset of terms commonly occurring in the search result set and the frequency of occurrence of the commonly occurring terms in the subset, the frequency of occurrence of the commonly occurring terms in the subset determined from the master vector.

2. The method of claim 1, wherein generating the search result interface definition comprises including an indication of the determined frequency of occurrence of each of the terms in the search result set.

3. The method of claim 2, wherein the indication of the determined frequency of occurrence of each of the terms in the search result set is a histogram.

4. The method of claim 3, wherein each indication of the frequency of occurrence is a bar and a length of the bar indicates the frequency of occurrence of the corresponding term in the histogram.

5. The method of claim 2, wherein each indication of the determined frequency of occurrence of each of the terms is a color shade and wherein an intensity of the color shade indicates the relevant frequency of the corresponding term in the search result set.

6. The method of claim 1, further comprising:
receiving at the remote device a selection of one of the terms in the subset of terms in the search result set; and
adding the selected term to the search query.

7. The method of claim 6, further comprising:
displaying the selected term in a visually distinctive manner relative to terms in the subset of terms in the search result set.

8. The method of claim 1, further comprising:
receiving at the remote device a selection of one of the terms in the search query; and
removing the selected term from the search query.

9. The method of claim 1, further comprising:
receiving at the remote device a first weight to a first term in the subset of terms in the search result set;
receiving at the remote device a second weight to a second term in the subset of terms in the search result set; and
sorting the search result set based on the first weight assigned to the first term and the second weight assigned to the second term; and
displaying the sorted search result set to the user.

10. The method of claim 9, wherein each of the first weight and second weight are one of: a positive weight and a negative weight.

11. The method of claim 9, further comprising:
displaying terms of the subset of terms of the search result set with a visual indication indicating the terms have been weighted.

12. The method of claim 10, further comprising:
displaying terms that have been positively weighted in a first color; and
displaying terms that have been negatively weighted in a second color.

13. The method of claim 12, further comprising:
using a color shade to show the level of the weighting.

14. The method of claim 1, further comprising:
displaying each term in the plurality of terms in the search result set that is also a search term in the search query in a visually distinctive manner relative to terms in the subset of terms in the search result set that are not search terms in the search query.

15. The method of claim 1, wherein the master vector is sorted so that the most frequently occurring terms are located at one end of the master vector.

16. The method of claim 15, wherein the local vector is a multi-dimensional vector wherein each dimension in the vector is represented by a specific term and the magnitude of the local vector in the dimension represented by each term is set as the frequency of the term in the associated meta-document.

17. The method of claim 16, further comprising:
receiving at the remote device a selection of at least one of the terms in subset of terms in the search result set;
creating a utility vector by inserting the selected term in to each dimension of the vector corresponding to a term that the user has selected;
performing a dot product of the utility vector and the local vector determined for each meta-document to determine a resulting local vector;
sorting the at least a portion of the set of meta-documents based on the resulting local vector frequency used as a document weight to re-rank the meta-documents and re-sort the list of meta-documents based on the selected term; and
displaying the sorted search result set to the user.

18. The method of claim 16, further comprising:
sending the generated search result interface definition to the remote device.

19. The method of claim 1, further comprising:
receiving the master vector, local vectors and the search result set at the visualization interface module on the remote device; and
displaying the search result set on the remote device.

20. The method of claim 1, further comprising:
receiving the master vector, local vector and the search result set at the visualization interface module on the server; and
generating a search result interface definition defining how to display the search result set on the remote device.

21. The method of claim 1, wherein analyzing at the server the generated search result set further comprises:
determining a plurality of non-relevant terms in the search result set, the non-relevant terms being ignored when determining the frequency of occurrence of terms in the summaries of the meta documents of the search result, and when determining the frequency of occurrence of terms in the search result set; and
determining root words of terms in the search result set, the root words of terms used in place of the associated terms when determining the frequency of occurrence of terms in the summaries of the meta documents of the search result, and when determining the frequency of occurrence of terms in the search result set.

22. The method of claim 21, wherein determining the plurality of non-relevant terms comprises:
determining if the term is three characters long or less; and
determining if the term is a definite article.

23. The method of claim 22, wherein determining root words of terms comprises using Porter's stemming algorithm.

24. The method of claim 1, wherein generating the search result set based on the received search query comprises:
sending the search query to a search engine; and
receiving a plurality of search results from the search engine in response to the search query.

25. A data processing system for creating and displaying enhanced search results, the data processing system comprising:
at least one processor;
a memory operatively coupled to the at least one processor;
a display device operative to display data; and
instructions stored in the memory executable by the at least one processor, the instructions when executed by the processor providing:
a search module generating a search result set based on a received search query containing at least one search term provided by a user, the search query received at a server through a network from a remote device the search result set comprising a plurality of meta-documents, each meta-document of the search result set corresponding to a computer readable document, each meta-document of the search result set comprising a summary of relevant terms present in the corresponding computer readable document;
a term frequency module analyzing the generated search result set including:
determining, for each meta-document in the search result set, a local frequency of occurrence of the relevant terms in the summary of the meta-document and adding the relevant terms and associated local frequency of occurrence to a local vector associated with the meta-document; and
generating a master vector of the frequency of occurrence of relevant terms in all of the meta-documents where each dimension in the master vector represents a term found in the local vectors; and a visualization interface module receiving the master vector, local vectors and the search result set for displaying the search result set on the remote device simultaneously with a subset of terms commonly occurring in the search result set and the frequency of occurrence of the commonly occurring terms in the subset, the frequency of occurrence of the commonly occurring terms determined from the master vector.

26. The data processing system of claim 25, wherein the search result interface generated by the interface generation module includes an indication of the determined frequency of occurrence of each of the terms of the subset of terms in the search result set.

27. The data processing system of claim 26, wherein the indication of the determined frequency of occurrence of each of the terms in the search result set is a histogram.

28. The data processing system of claim 27, wherein each indication of the determined frequency of occurrence of each of the terms is a color shade and wherein an intensity of the color shade indicates the relevant frequency of the corresponding term in the search result set.

29. The data processing system of claim 25, wherein the visualization interface is further for:
receiving a selection of one of the terms in the plurality of terms in the search result set; and
adding the selected term to the search query.

30. The data processing system of claim 29, wherein the visualization interface is further for:
displaying the selected term in a visually distinctive manner relative to terms in the subset of terms of the search result set.

31. The data processing system of claim 25, wherein the visualization interface is further for:
receiving a selection of one of the terms in the search query; and
removing the selected term from the search query.

32. The data processing system of claim 25, wherein the visualization interface is further for:
receiving a first weight to a first term in the subset of terms in the search result set;
receiving a second weight to a second term in the subset of terms in the search result set;
sorting the search result set based on the first weight assigned to the first term and the second weight assigned to the second term; and
displaying the sorted search result set to the user.

33. The data processing system of claim 32, wherein each of the first weight and second weight are one of: a positive weight and a negative weight.

34. The data processing system of claim 25, wherein the visualization interface module is further for displaying each term in the subset of terms in the search result set that is also a search term in the search query in a visually distinctive manner relative to terms in the subset of terms in the search result set that are not search terms in the search query.

35. The data processing system of claim 25, wherein the term frequency module further including:
determining a plurality of non-relevant terms in the search result set, the non-relevant terms being ignored when determining the frequency of occurrence of terms in the summaries of the meta documents of the search result, and when determining the frequency of occurrence of terms in the search result set; and
determining root words of terms in the search result set, the root words of terms used in place of the associated terms when determining the frequency of occurrence of terms in the summaries of the meta documents of the search result, and when determining the frequency of occurrence of terms in the search result set.

36. The data processing system of claim 35, wherein determining the plurality of non-relevant terms comprises:
determining if the term is three characters long or less; and
determining if the term is a definite article.

37. The data processing system of claim 36, wherein determining root words of terms comprises using Porter's stemming algorithm.

38. The data processing system of claim 25, wherein the search module generating the search result set based on the received search query comprises:
sending the search query to a search engine; and
receiving a plurality of search results in response to the search query.

39. The data processing system of claim 25, wherein components of the visualization interface module are implemented in one of:
the server;
the remote device; and
a combination of the server and the remote device.

40. The data processing system of claim 25, wherein the master vector is sorted so that the most frequently occurring terms are located at one end of the master vector.

41. The data processing system of claim 40, wherein the local vector is a multi-dimensional vector wherein each dimension in the vector is represented by a specific term and the magnitude of the local vector in the dimension represented by each term is set as the frequency of the term in the associated meta-document.

42. The data processing system of claim 41, wherein the visualization interface is further for:
receiving a selection of at least one of the terms in the subset of terms in the search result set;
creating a utility vector by inserting the selected term in to each dimension corresponding to a term that the user has selected;
performing a dot product of the utility vector and the local vector determined for each meta-document to determine a resulting local vector;
sorting the at least a portion of the set of meta-documents based on the resulting local vector frequency used as a document weight to re-rank the meta-documents an resort the list of meta-documents based on the selected term; and
displaying the sorted search result set to the user.

43. A computer readable memory comprising instructions for execution on at least one processor, the instructions providing a method of creating and displaying enhanced search results, the method comprising:
receiving at a server a search query containing at least one search term provided by a user;
generating at the server a search result set based on the received search query, the search result set comprising a plurality of meta-documents, each meta-document of the search result set corresponding to a computer readable document, each meta-document of the search result set comprising a summary of relevant terms present in the corresponding computer readable document;
analyzing at the server the generated search result set comprising:
determining, for each meta-document in the search result set, a local frequency of occurrence of the relevant terms in the summary of the meta-document and adding the relevant terms and associated local frequency of occurrence to a local vector associated with the meta-document; and generating a master vector of the frequency of occurrence of relevant terms in all of the meta-documents where each dimension in the master vector represents a term found in the local vectors; and providing the master vector, the local vectors and the search result set to a visualization interface module for displaying the search result set on the remote device, simultaneously with a subset of terms commonly occurring in the search result set and the frequency of occurrence of the commonly occurring terms in the subset, the frequency of occurrence of the commonly occurring terms in the subset determined from the master vector.

44. The computer readable memory of claim 43, further comprising instructions for:

receiving a selection of one of the terms in the plurality of terms of the search result set; and adding the selected term to the search query.

45. The computer readable memory of claim 43, further comprising instructions for:

receiving a selection of one of the terms in the subset of terms of the search result set that is also a search term in the search query; and remove the selected term from the search query.

46. The computer readable memory of claim 43, wherein the local vector is a multi-dimensional vector where each dimension in the vector is represented by a specific term and the magnitude of the local vector in the dimension represented by each term is set as the frequency of the term in the associated meta-document, the computer readable memory comprising instructions for:

receiving a selection of at least one of the terms in the subset of terms of the result set;

creating a utility vector by inserting the selected term in to each dimension of the vector corresponding to a term that the user has selected;

performing a dot product of the utility vector and the local vector determined for each meta-document to determine a resulting local vector;

sorting the at least a portion of the set of meta-documents based on the resulting local vector frequency used as a document weight to re-rank the meta-documents and re-sort the list of meta-documents based on the selected term.

displaying the sorted search result set to the user.

47. The computer readable memory of claim 43, further comprising instructions for:

receiving a first weight to a first term in the subset of terms of the search result set;

receiving a second weight to a second term in the subset of terms of the search result set;

sorting the search result set based on the first weight assigned to the first term and the second weight assigned to the second term; and displaying the sorted search result set to the user.

48. The computer readable memory of claim 47, further comprising instructions for:

displaying each term in the subset of terms in the search result set with a visual indication indicating whether a term has been weighted by a user.

\* \* \* \* \*

UNITED STATES PATENT AND TRADEMARK OFFICE
CERTIFICATE OF CORRECTION

| | | |
|---|---|---|
| PATENT NO. | : 7,788,261 B2 | Page 1 of 1 |
| APPLICATION NO. | : 11/640817 | |
| DATED | : August 31, 2010 | |
| INVENTOR(S) | : Hoeber et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 179 days.

Signed and Sealed this

Second Day of November, 2010

David J. Kappos
*Director of the United States Patent and Trademark Office*